A. AICHELE.
ELECTRIC DRIVING MECHANISM FOR VEHICLES.
APPLICATION FILED NOV. 18, 1909.
960,140.
Patented May 31, 1910.
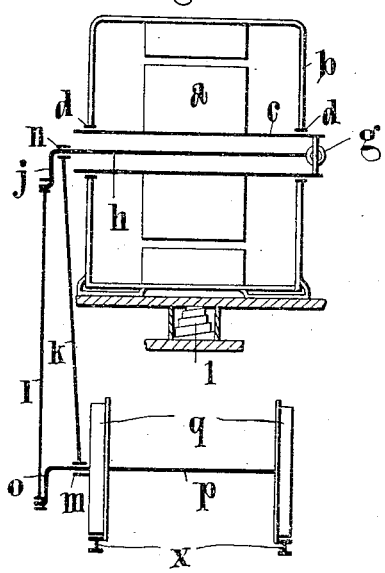
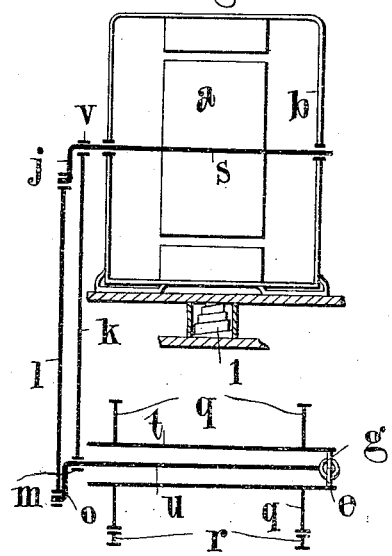
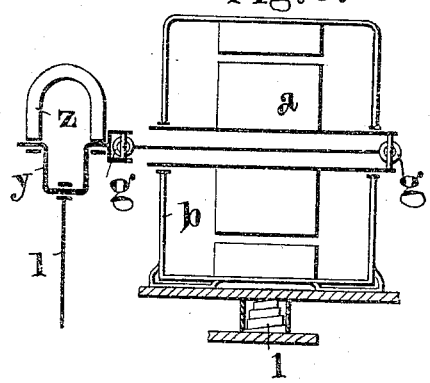

UNITED STATES PATENT OFFICE.

ALBERT AICHELE, OF BADEN, SWITZERLAND, ASSIGNOR TO AKTIENGESELLSCHAFT BROWN BOVERI & CIE., OF BADEN, SWITZERLAND.

ELECTRIC DRIVING MECHANISM FOR VEHICLES.

960,140.   Specification of Letters Patent.   Patented May 31, 1910.

Application filed November 18, 1909. Serial No. 528,742.

*To all whom it may concern:*

Be it known that I, ALBERT AICHELE, a citizen of the Swiss Republic, and residing at Wiesenstrasse, Canton Aargau, Baden, Switzerland, have invented certain new and useful Improvements in and Relating to Electric Driving Mechanism for Vehicles, of which the following is a specification.

This invention relates to the electric driving of vehicles such as railway vehicles in which the motor is stationarily mounted on a frame, and the object of the invention is to obtain a construction which will prevent jerks or irregularities from the wheels or rails being imparted to the motor.

The invention consists in connecting the wheel axle or the like to the motor drive by a flexible jointed or universal coupling whereby irregularities from the wheels or rails will not be transmitted to the motor frame.

The invention also consists in the improvements in and relating to the electric driving of railway vehicles hereinafter described.

Referring to the accompanying drawings, Figure 1 illustrates a form of the invention in which a rigid wheel shaft is connected to the motor through a jointed motor shaft. Fig. 2 illustrates a modification of the invention in which the motor shaft is rigid but the wheel shaft jointed. Fig. 3 illustrates a further modification in which a double jointed shaft is used at the motor.

In carrying the invention into effect according to the form illustrated in Fig. 1, the rotating part of the motor indicated by $a$, is mounted on a hollow shaft $c$ rotatable in bearings $d$, which shaft $c$ is connected to an axle $h$ by a pivoted or universal connection $g$. The other end of the rod $h$ is formed as a crank $j$, which through the link $l$ and crank $o$ transmits power to the axle $p$ of the wheels $q$, running on rails $r$. The axle $p$ is further connected through a bearing or sleeve $m$, and the link $k$, to the axle $h$, by a bearing or sleeve $n$. It will thus be seen that owing to the connections between the axles $p$ and $h$, irregularities set up from the former axle, will not be transmitted to the rotating part of the motor whether the same be rigidly mounted or whether it be spring mounted, for example, as diagrammatically illustrated on springs 1.

In the form of the invention shown in Fig. 2 the motor $a$ has a rigid shaft $s$ connected through crank $j$, link $l$ and crank $o$, with an axle $u$ in connection with a hollow shaft $t$, of the wheels $q$ by means of a coupling $g$ as in Fig. 1.

In the form of the invention shown in Fig. 3 the crank $y$ in bearings in a stationary frame $z$ operates link $l$. Through two universal couplings $g$, the crank is connected to the hollow shaft $c$, of the motor as in Fig. 1.

It will be noted that in all the above forms the axle adjoining the universal coupling (or couplings) passes through the hollow shaft throughout its entire length, but such is not essential to the invention.

It will be noted that the links, $k$, are situate at no great distance from the link $l$, this is for the purpose of insuring that no jamming or catching of the two members should occur on alteration of the relative position of the motor and the wheel axle.

Having now described my invention what I claim as new and desire to secure by Letters Patent is:—

1. In an improved means for transmitting power and in combination, a driving shaft and a driven shaft, one of said shafts being hollow, and flexible power transmitting mechanism connected with said hollow shaft at one end and extending through said hollow shaft, and having connection with the other shaft at the opposite end.

2. In an improved means for transmitting power and in combination, a driving shaft and a driven shaft, said shafts being substantially parallel and one of them being hollow, an auxiliary shaft within the hollow shaft and having one end connected thereto by a universal joint, a driving connection connecting the opposite end of said auxiliary shaft with the other shaft, and a rigid coupling between said other shaft and said auxiliary shaft.

3. In an improved means for transmitting power and in combination, a driving and a driven shaft, one of said shafts being hollow and the other having a crank at one end, an auxiliary shaft within the hollow shaft having one end projecting from the hollow shaft and carrying a crank and having its other end connected to the hollow shaft by a universal joint, a pitman connecting the said cranks, and a brace rod extending between the cranked shaft and auxiliary shaft.

4. An improved electric drive for rail vehicles comprising in combination a motor axle and a rail wheel axle, one of said axles being hollow and flexible power transmitting mechanism connected at one end with said hollow axle and extending at least partially through the same and at the other end connected with the other axle; as set forth.

5. An improved electric drive for vehicles comprising in combination an electric motor, a hollow shaft for said motor, a shaft within said hollow shaft and connected thereto by a flexible coupling, a wheel axle, a driving connection between said axle and said shaft, and a rigid coupling between the axle and the shaft; as set forth.

6. An improved electric drive for vehicles comprising in combination a stationary electric motor, a hollow shaft bearing in the frame of said motor a rigid shaft situate within the said hollow shaft for at least part of the length of the latter and connected thereto by a universal coupling disposed within said hollow shaft; as set forth.

In testimony whereof, I affix my signature in presence of two witnesses.

ALBERT AICHELE.

Witnesses:
CARL JUL. SCHMIDT,
CARL GUBLER.